United States Patent
Schafmeister et al.

(10) Patent No.: US 8,278,899 B2
(45) Date of Patent: Oct. 2, 2012

(54) DIGITAL SLOPE COMPENSATION FOR CURRENT MODE CONTROL

(75) Inventors: Frank Schafmeister, Warburg (DE); Tobias Grote, Luegde (DE)

(73) Assignee: DET International Holding Limited, Grand Cayman (KY)

( * ) Notice: Subject to any disclaimer, the term of this patent is extended or adjusted under 35 U.S.C. 154(b) by 86 days.

(21) Appl. No.: 12/871,561

(22) Filed: Aug. 30, 2010

(65) Prior Publication Data

US 2011/0115458 A1    May 19, 2011

(30) Foreign Application Priority Data

Sep. 18, 2009    (EP) ..................................... 09405161

(51) Int. Cl.
*G05F 1/00*      (2006.01)

(52) U.S. Cl. ...................................................... 323/283

(58) Field of Classification Search .................. 323/282, 323/283, 284, 285
See application file for complete search history.

(56) References Cited

U.S. PATENT DOCUMENTS

| | | | |
|---|---|---|---|
| 5,525,874 A | 6/1996 | Mallarapu et al. | |
| 7,236,376 B2 | 6/2007 | Yang | |
| 7,433,599 B2 | 10/2008 | Takahara et al. | |
| 7,479,778 B1 | 1/2009 | Broach et al. | |
| 2003/0080719 A1* | 5/2003 | Watanabe et al. | 323/288 |
| 2008/0238391 A1* | 10/2008 | Williams et al. | 323/283 |
| 2009/0174379 A1* | 7/2009 | Lima et al. | 323/282 |

* cited by examiner

*Primary Examiner* — Nguyen Tran
(74) *Attorney, Agent, or Firm* — Birch, Stewart, Kolasch & Birch, LLP

(57) ABSTRACT

A digital slope compensation apparatus and method for a switched-mode power supply use a sensor for sensing and generating an analog inductor current ($i_L$) of the switched-mode power supply, a comparator (2) for generating a trigger signal according to a comparison of an analog current threshold level and the analog inductor current ($i_L$), and a pulse width modulator (PWM) for controlling the operation of a switched-mode power supply, wherein the pulse width modulator (PWM) is arranged to be triggered by the trigger signal of the comparator. A first analog to digital converter is arranged for converting an analog output voltage ($V_{out}$) of the switched-mode power supply into a digital output voltage, means are arranged for transforming the digital output voltage into a digital current threshold level ($i_{cmp}$) and a digital to analog converter is arranged for generating the analog current threshold level according to the digital current threshold level ($i_{cmp}$).

18 Claims, 11 Drawing Sheets

DIGITAL SLOPE COMPENSATION FOR CURRENT MODE CONTROL

TECHNICAL FIELD

The invention relates to a digital slope compensation apparatus for a switched-mode power supply, wherein a sensor is used for sensing an analog inductor current of the switched-mode power supply, a comparator is used for generating a trigger signal according to a comparison of an analog current threshold level and the analog inductor current, and a pulse width modulator is used for controlling the operation of a switched-mode power supply, wherein the pulse width modulator is arranged to be triggered by the trigger signal of the comparator. The invention further relates to a digital slope compensation method for a switched-mode power supply, wherein an analog inductor current of the switched-mode power supply is sensed, a trigger signal according to a comparison of an analog current threshold level and the analog inductor current is generated, and a pulse width modulated signal is triggered by the trigger signal to control operation of the switched-mode power supply.

BACKGROUND ART

Current mode control is the commonly used control method for switched-mode power supplies (SMPS). Compared to voltage mode control, it exhibits a high frequency bandwidth resulting in improved control loop dynamics and leads to a better line noise rejection. With reducing the small-signal dynamics from second-order to first-order, it additionally simplifies the outer voltage loop design.

Current mode control can be classified into average current mode and peak current mode. As the name implies, average current mode control adjusts the average inductor current. In particular, in boost-type power factor correction (PFC) rectifiers, average current control ensures very low current distortions. Peak current mode is the widely-used current mode control technique, where the duty cycle is terminated when the inductor current reaches a threshold level defined by the outer voltage controller. This technique features some inherent advantages such as simple cycle-by-cycle current limiting and good current sharing of paralleled converters. A combination of average and peak current control is the transition or boundary mode control, where the converter is driven at the border of continuous conduction mode (CCM) and discontinuous conduction mode (DCM). Characteristic of the boundary mode is the varying switching frequency and that the peak current is twice as large as the average current. But extra effort is needed to detect the zero current.

U.S. Pat. No. 7,479,778 (National Semiconductors Corp.) discloses a system for adaptively adjusting parameters in a switching regulator based on a slope that is associated with an inductor. A control loop is responsive to a ramp signal generated by a ramp generator with a capacitor and a current source, where at least one of the current source and the capacitor are adjusted to vary the slope of the ramp signal. By dynamically adjusting the slope of the ramp signal, slope compensation is provided for a range of inductor values that can dynamically change during operation. Adjustment may be performed by analog circuits comprising transistors or by a DAC (DAC: Digital to Analog Converter) controlling a current source.

U.S. Pat. No. 7,236,376 (System General Corp.) discloses controlling the output current at the primary side of a power supply. A sense signal of the primary side switching current is fed to a waveform detector of a controller. The waveform detector generates a current-waveform signal. An average current signal is generated in response to the current-waveform signal. An integrator generates an integrated signal, which is correlated with the switching period of a switching signal and proportional to the output current. The pulse width of the switching signal is controlled and the output current of the power supply can be regulated.

U.S. Pat. No. 7,433,599 (Fujitsu Limited) discloses an automatic dispersion compensation device compensating for transmission quality degradation in an optical communication system. A transmission quality measurement unit and a dispersion compensation amount control unit are provided. A program enables a computer to perform a step of receiving measurement results, a step of detecting and separating transmission quality degradation, and a step of controlling compensation.

However, there are several drawbacks of peak current mode control in CCM: The control is loosing stability, if the duty cycle exceeds 50%, resulting in subharmonic oscillations, non ideal control response caused by peak instead of average current sensing and noise sensitivity, particularly at small inductor current ripple. A common approach to regain stability is to apply so called slope compensation in peak current controlled converters with duty cycles above 50%. With increasing computing capability and decreasing cost, DSP and microcontroller-based digital control becomes increasingly important in SMPS applications. This measure offers a number of benefits such as flexibility and programmability, decreased number of active and passive components resulting in improved reliability, negligible or compensable offsets and thermal drifts. Additionally, digital control offers the potential of implementing sophisticated, adaptive and nonlinear control methods to improve static and dynamic performance.

Completely digitally controlled converters predominantly calculate the duty cycle and use integrated digital pulse width modulation (DPWM) generators to control the switches. Also the full digital peak current control including prior art slope compensation is based on pre-calculating the desired duty cycle requiring accurate knowledge of the inductor value L. Using these techniques, the inherent advantages of peak current control mentioned above could not be used. However, with available microcontrollers including on-chip comparators and dedicated integrated DACs at the comparator's internal input, a purely digital peak current control is basically feasible with a simple component. Nevertheless, the implementation of the slope compensation in a digital control stays challenging, since a continuously increasing ramp function is needed during each switching cycle.

SUMMARY OF THE INVENTION

It is the object of the invention to create an apparatus and a method pertaining to the technical field initially mentioned that provides a decreased number of active and passive components as well as improved reliability.

The solution of the invention is specified by the features of claim 1. According to the invention a first analog to digital converter is arranged for converting an analog output voltage of the switched-mode power supply into a digital output voltage. Means are arranged for transforming the digital output voltage into a digital current threshold level, and a digital to analog converter is arranged for generating the analog current threshold level according to the digital current threshold level.

According to the invention, a digital slope compensation technique for peak current control is proposed not using a ramp and therefore decreasing the number of components, but rather pre-calculating the desired comparator switch-off threshold.

In a preferred embodiment, a voltage controller is arranged to receive the digital output voltage and to generate a digital current reference. A second analog to digital converter is arranged to convert the analog inductor current of the switched-mode power supply into a digital inductor current, and a digital slope compensation module is arranged to receive the digital current reference, the digital inductor current, and a compensation factor to generate the digital current threshold level.

The desired comparator switch-off threshold is pre-calculated depending on the valley inductor current.

Preferably, the compensation factor is arranged to be a constant value. Hence, the compensation factor is calculated only once and is fixed—ideally—during the entire lifetime of the power switching unit. But if required, the compensation factor can be readjusted simply via software update—even if the unit is in the field. Functionality of the prior art analog slope compensation is achieved with a decreased number of components and at the same time additional flexibility of readjustment via software update is gained.

In an alternative embodiment, an adaptive slope compensation factor module is arranged to generate the compensation factor. The compensation factor is continuously calculated during operation of the power switching unit, which leads to improved dynamic responses together with decreased number of components.

Preferably, a third analog to digital converter is arranged to convert an analog input voltage of the switched-mode power supply into a digital input voltage. The adaptive slope compensation factor module is arranged to receive the digital output voltage and the digital input voltage to generate the compensation factor.

Dependent on measured input voltage and output voltage, the compensation factor is continuously re-calculated during operation of the power switching unit. Knowledge of the inductor value is not necessary. Adaptive algorithms keep the amount of slope compensation adjustable to achieve minimum response time without occurrence of subharmonic oscillation.

In a preferred embodiment, the apparatus is integrated into a part of a microcontroller. Hence, a single microcontroller facilitates the whole control including slope compensation. Up to now, digital voltage control was possible within the microcontroller, but for slope compensation one had to stay analog and to use an analog circuitry with additional components.

In a digital slope compensation method for a switched-mode power supply, an analog output voltage of the switched-mode power supply is converted into a digital output voltage, the digital output voltage is transformed into a digital current threshold level, and the analog current threshold level is generated according to the digital current threshold level.

Preferably, the digital current reference level is generated according to the digital output voltage, the analog inductor current of the switched-mode power supply is converted into a digital inductor current, and the digital current threshold level is generated according to the digital current reference, the digital inductor current, and a compensation factor.

Preferably, a compensation factor with a constant value is used.

Alternatively, an adaptive slope compensation factor module generates the compensation factor.

Preferably, an analog input voltage of the switched-mode power supply is converted into a digital input voltage, and the compensation factor is generated according to the digital output voltage and the digital input voltage.

Preferably, a microcontroller is used to carry out the method.

Other advantageous embodiments and combinations of features come out from the detailed description below and the totality of the claims.

BRIEF DESCRIPTION OF THE DRAWINGS

The drawings used to explain the embodiments show.

PREFERRED EMBODIMENTS

Figure 1:
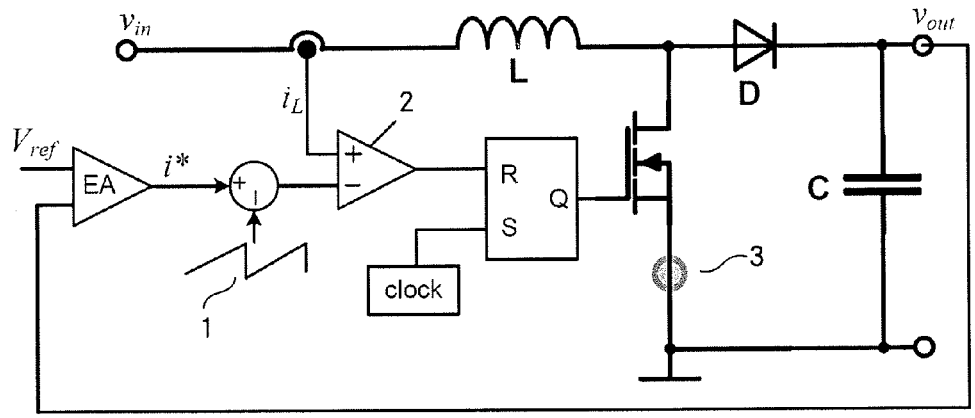
FIG. 1 a peak current controlled boost converter with slope compensation.

Current mode control is well known in prior art. The control blocks of a boost converter with outer voltage loop and inner peak current control loop with analog slope compensation is shown in FIG. 1. The basic principles of peak current mode control and the need of slope compensation are as follows.

In order to derive the stability criterion of peak current mode controlled CCM converters which characterizes the transition to subharmonic oscillations, the operation without slope compensation shall be analyzed in a first step. Therefore we refer to FIG. 2 where an undisturbed (solid stroke) and a disturbed (dashed stroke) inductor current are plotted versus a single switching period $T_s$. Both inductor current shapes have the same rising slope $m_1$, falling slope $m_2$ and peak value $\hat{i}$.

Figure 2:
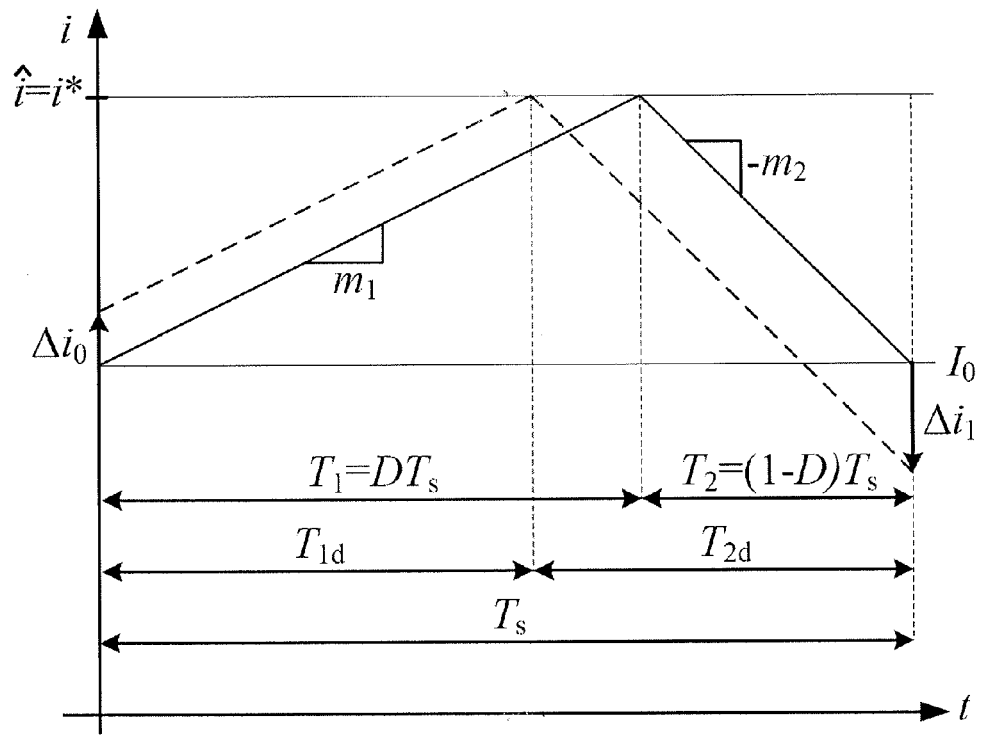
FIG. 2 growing disturbance in the inductor current under peak current control for $m_2 > m_1$.

For the undisturbed case (solid line in FIG. 2) it can be directly derived $$\hat{i} = m_1 \cdot T_1 + I_0 \quad (1)$$

as well as $$\hat{i} - m_2 \cdot T_2 = I_0 \quad (2)$$

whereas for a disturbance of $\Delta i_0$ (dashed line in FIG. 2)

$$\hat{i} = \Delta i_0 + m_1 \cdot T_{1d} + I_0 \quad (3)$$

and $$\hat{i} - m_2 \cdot T_{2d} = I_0 + \Delta i_1. \quad (4)$$

In both cases the duration of the switching period is identical, because of time-triggered turn-on, $$T_s = T_1 + T_2 = T_{1d} + T_{2d}. \quad (5a)$$

After solving (1) for $T_1$, (2) for $T_2$, (3) for $T_{1d}$, and (4) for $T_{2d}$, equation (5a) can be rewritten as $$\frac{\hat{i} - I_0}{m_1} + \frac{\hat{i} - I_0}{m_2} = \frac{\hat{i} - \Delta i_0 - I_0}{m_1} + \frac{\hat{i} - \Delta i_1 - I_0}{m_2} \quad (5b)$$

and directly simplified to $$0 = \frac{\Delta i_0}{m_1} - \frac{\Delta i_1}{m_2}, \quad (5c)$$

which is equivalent to $$\Delta i_1 = -\frac{m_2}{m_1} \cdot \Delta i_0. \quad (5d)$$

If the magnitude of the current falling slope $m_2$ is larger than that of the rising slope $m_1 < m_2$, the current perturbation $\Delta i$ obviously grows. The current error drift propagates with every switching period and after n cycles, the perturbation will become $$\Delta i_n = \left(-\frac{m_2}{m_1}\right)^n \cdot \Delta i_0. \quad (6)$$

Figure 3:
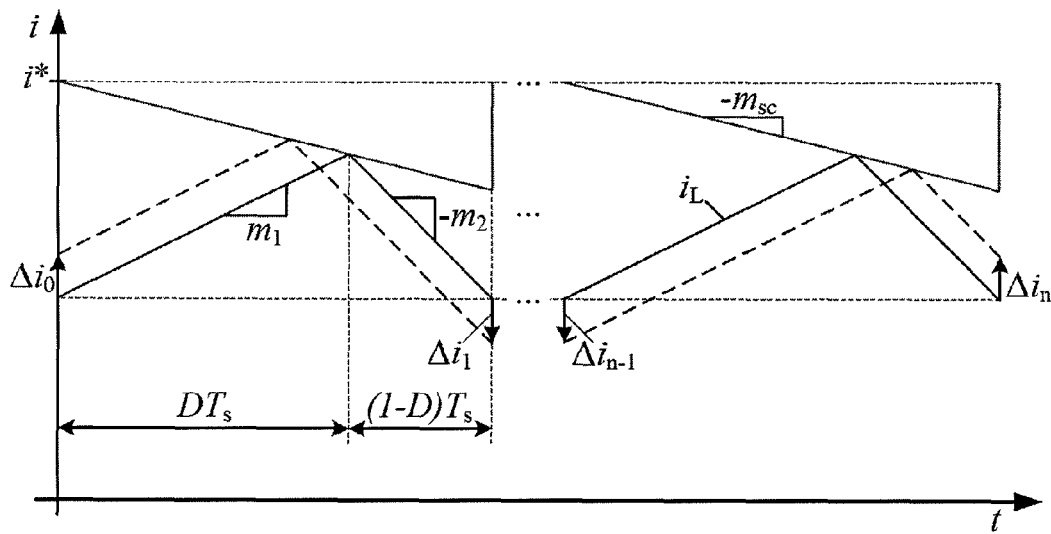
FIG. 3 inductor current under peak current control with slope compensation.

For steady state conditions, the ratio of current falling slope to rising slope can be expressed as $$\frac{m_2}{m_1} = \frac{D}{1-D}, \quad (7)$$

where D is the duty cycle (c.f. also FIG. 3).

From (6) and (7) it follows that the instability inherently occurs as long as the duty cycles exceed 50% (D>0.5).

The instability for D>0.5 can be eliminated, if a compensation ramp is added to the switch-off threshold as shown in FIG. 3. When introducing the additional compensation slope $m_{sc}$ the calculation similar to (1)-(6) directly yields as modified formula for the current perturbation after n cycles $$\Delta i_n = \left(-\frac{m_2 - m_{sc}}{m_1 + m_2}\right)^n \cdot \Delta i_0. \quad (8)$$

From (8) it follows that for a stable current loop $$\left|\frac{m_2 - m_{sc}}{m_1 + m_2}\right| < 1$$

must be fulfilled and therefore the required amount of compensation ramp results as $$m_{sc} > \frac{1}{2}(m_2 - m_1). \quad (9)$$

Assuming a constant inductance L, the slope is proportional to the inductor voltage. Table I contains the corresponding voltages $m_1 L$, $m_2 L$ and the required compensation $m_{sc} L$ for buck, boost and buck-boost converter.

TABLE I

|  | $m_1 L$ | $m_2 L$ | $m_{sc} L$ |
| --- | --- | --- | --- |
| Buck | $V_{in} - V_{out}$ | $V_{out}$ | $> V_{out} - 0.5 V_{in}$ |
| Boost | $V_{in}$ | $V_{out} - V_{in}$ | $> 0.5 V_{out} - V_{in}$ |
| Buck-Boost | $V_{in}$ | $V_{out}$ | $> 0.5 (V_{out} - V_{in})$ |

From (8) it can be seen that a perturbation can be compensated within only one cycle, if the slope of the compensation ramp $m_{sc}$ is equal to the falling current slope $m_2$. This characteristic is called dead-beat control and represents the fastest possible transient response. In the following this condition is named optimum slope compensation. If applying higher values of $m_{sc}$ than $m_2$, the settling takes several cycles without overshoot.

In applications with relatively small variation in input and output voltages, resulting in nearly constant duty cycle, a constant compensation slope suffices to achieve optimum compensation. Under varying input and/or output voltage (e.g. with PFC applications), the magnitude of the required compensation slope varies dynamically. Various solutions are known, for example adaptive slope compensation, piecewise linear slope compensation and as widely used nonlinear slope compensation. These techniques provide on the one hand optimum slope compensation over a wide range of duty cycle, but on the other hand they require more or less complex additional circuitry. Furthermore, using passive components provides no flexibility and inaccuracies caused by component tolerance and thermal drift are likely to occur.

All slope compensation techniques described in the previous section base on analog circuitry implementations. With the impact of digital control in SMPS it is desirable also to implement peak current control in a digital manner. This is feasible with microcontrollers containing analog comparators (e.g. PIC, dsPIC, Piccolo). Thereby the discrete threshold value is converted into an analog voltage representing the current threshold level for the on-chip comparator. The DPWM unit is used to turn on at the beginning of each new cycle and to limit the duty cycle to a maximum tolerable value. The comparator output is directly linked with DPWM generator and forces the DPWM output to turn off. Because no current has to be sampled and no code has to be executed to compute a duty cycle the introduced deadtime is minimized for the current control loop.

However, with the need of slope compensation an adequate technique for this digital peak current control has to be designed. An obvious solution could be to remain the slope compensation in analog technique and add a ramp to the inductor current signal. Using such an approach, however, no benefits in terms of complexity and adaptivity can be achieved. Digital implementation of the ramp compensation requires to permanently decrement the discrete threshold value within every switching cycle with minimal possible step size. This appears to be impractically using a reasonable microcontroller.

Hence, the task arises to propose a concept of digital slope compensation without using a ramp. Instead, the desired threshold level with integrated amount of compensation is pre-calculated by means of the valley current $i_n$, i.e. the inductor current $i_{L\_min}$ at the beginning of the cycle n.

Figure 4:
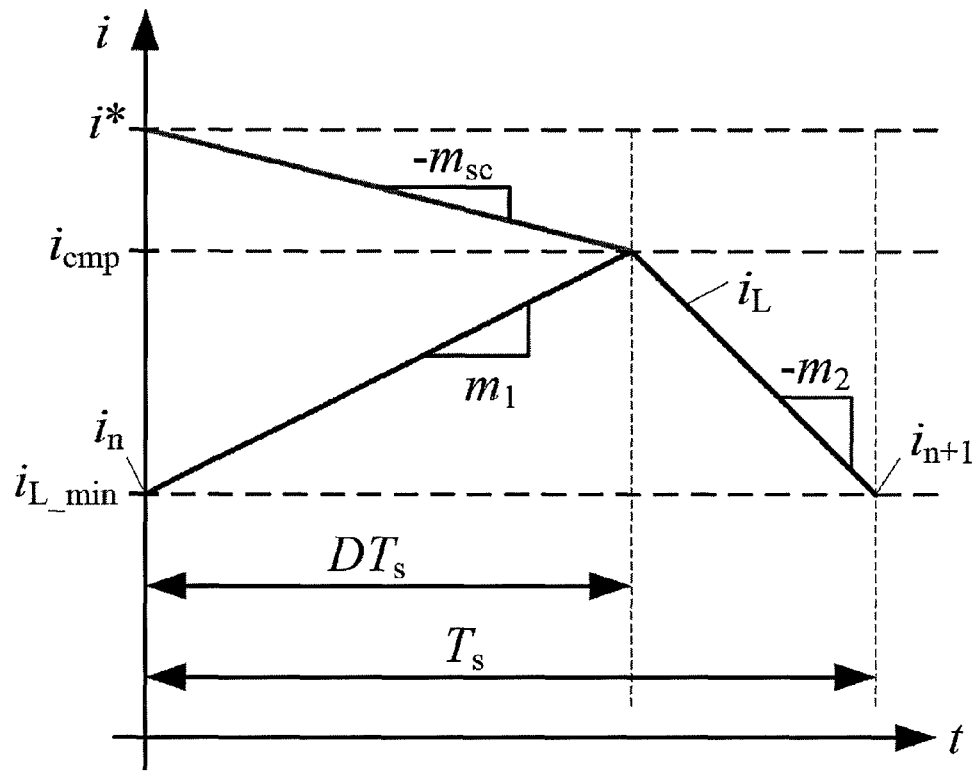
FIG. 4 inductor current characteristics to illustrate principle of digital slope compensation.

As indicated in FIG. 4, the current threshold level $i_{cmp}$ can be expressed as $$i_{cmp} = i_n + m_1 \cdot DT_s \quad (10)$$

or $$i_{cmp} = i^* - M_{sc} \cdot DT_s. \quad (11)$$

From (10) and (11) we obtain $$DT_s = \frac{i^* - i_n}{m_1 + m_{sc}}. \quad (12)$$

Using (12) to eliminate $DT_s$ from (11) we get $$i_{cmp} = i^* - m_{sc} \frac{i^* - i_n}{m_1 + m_{sc}}. \quad (13)$$

At this point we introduce a compensation factor $k_{sc}$ as $$k_{sc} = \frac{m_{sc}}{m_1}. \quad (14)$$

Thus, (13) can be expressed as $$i_{cmp} = i^* - \frac{k_{sc}}{1+k_{sc}}(i^* - i_n) \text{ or } i_{cmp} = \frac{1}{1+k_{sc}}(i^* + k_{sc} i_n). \quad (15)$$

Hence, the required current threshold level for the comparator can be computed by the current reference value i* and the valley current value $i_n$. The current reference i* is obtained from the voltage controller and the valley current $i_n$ has to be sampled every switching-on event and passed via analog-digital converter (ADC) to the digital control.

In order to fit the computed threshold value with adequate slope compensation, a proper value for the compensation factor $k_{sc}$ has to be chosen. The minimum desired values to avoid subharmonic oscillations and values for optimum slope compensation for buck, boost and buckboost converter extracted from Table I are summarized in Table II. Note, that the minimum value for $k_{sc}$ needs to be limited to zero.

By measuring input and output voltage it is quite simple to use the entries from Table II to implement an algorithm for an adaptive compensation factor that guarantees desired dynamic over a wide range of operation.

TABLE II

|  | min. $k_{sc}$ | optimum $k_{sc}$ |
|---|---|---|
| Buck | $\frac{V_{out} - 0.5\ V_{in}}{V_{in} - V_{out}}$ | $\frac{V_{out}}{V_{in} - V_{out}}$ |
| Boost | $\frac{0.5\ V_{out} - V_{in}}{V_{in}}$ | $\frac{V_{out} - V_{in}}{V_{in}}$ |
| Buck-Boost | $\frac{0.5(V_{out} - V_{in})}{V_{in}}$ | $\frac{V_{out}}{V_{in}}$ |

Figure 5:
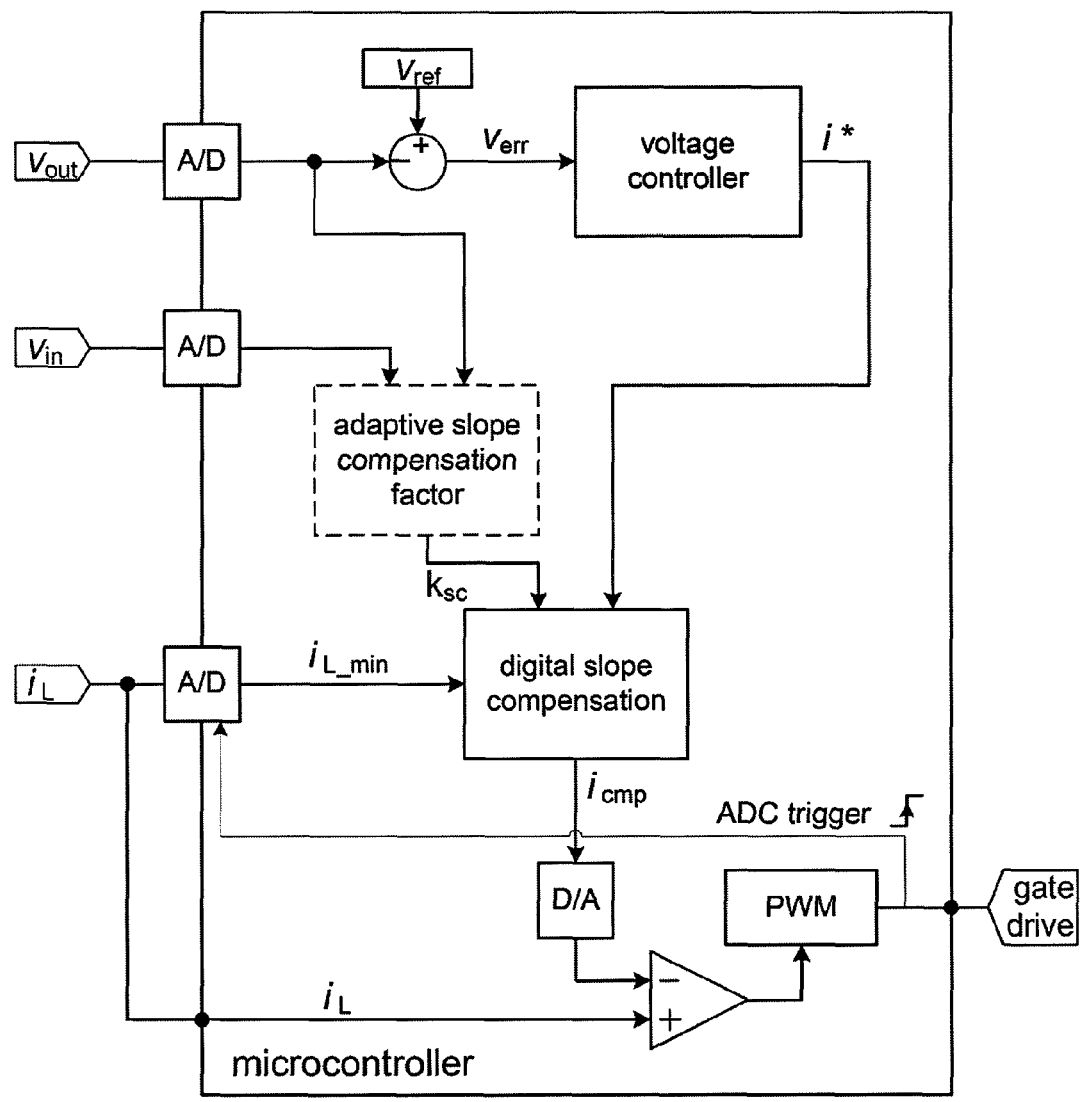
FIG. 5 scheme of the digital control structure implemented on microcontroller

The structure of the digital control is illustrated in FIG. 5. Computation of an adaptive compensation factor is an option and can be replaced by a constant value if no adaptivity is required. It has to be pointed out, that no knowledge of inductor value or other circuit parameters is required for the proposed current control technique.

Assuming inductor currents of triangular shape it is possible to identify the average inductor current $i_{avg}$ with the known current extrema $i_{cmp}$ and $i_n$:

$$i_{avg} = \frac{1}{2}(i_{cmp} + i_n). \quad (16)$$

This can be useful in PFC applications to maintain sinusoidal input current.

The effectivity of the digital slope compensation concept is verified by simulation. Therefore this method is compared with the equivalent conventional slope compensation.

Figure 6:
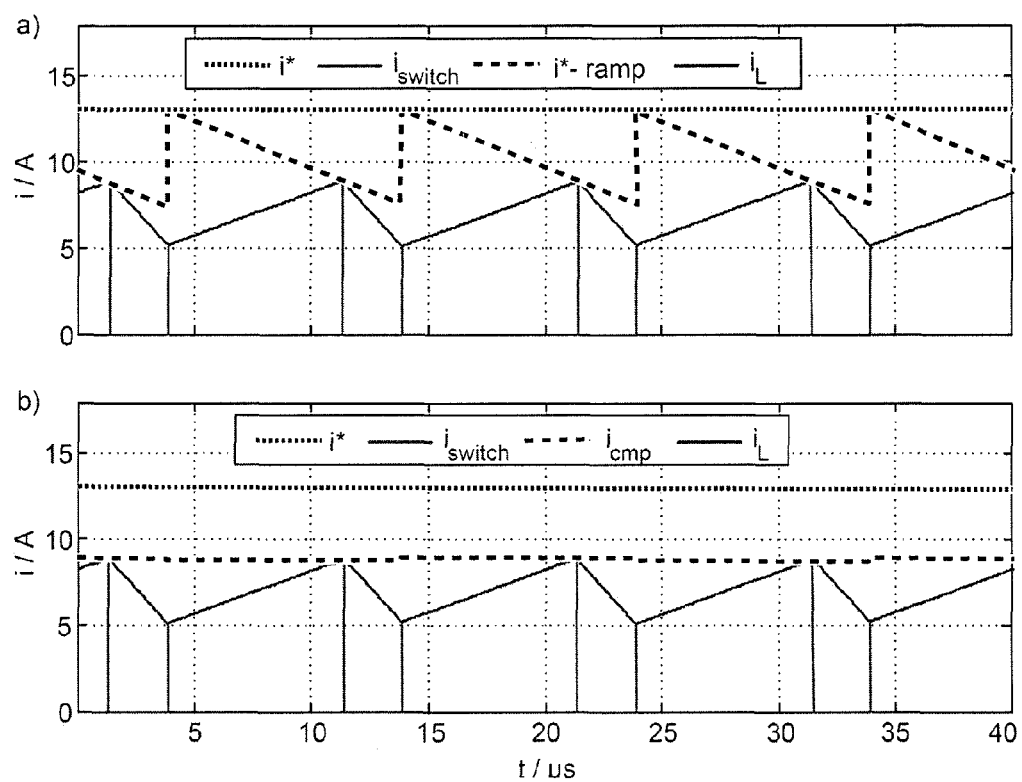
FIG. 6, FIG. 7, FIG. 8 simulation results of peak current control with slope compensation In the figures, the same components are given the same reference symbols.

FIG. 6 shows the inductor current under steady state conditions with conventional compensation ramp and with digital slope compensation (D=0.82, $k_{sc}$=1.8). In FIG. 6 results for conventional compensation ramp (a) and for computed current threshold level (b) are shown. As can be seen, there is no difference in the resulting current shapes.

Figure 7:
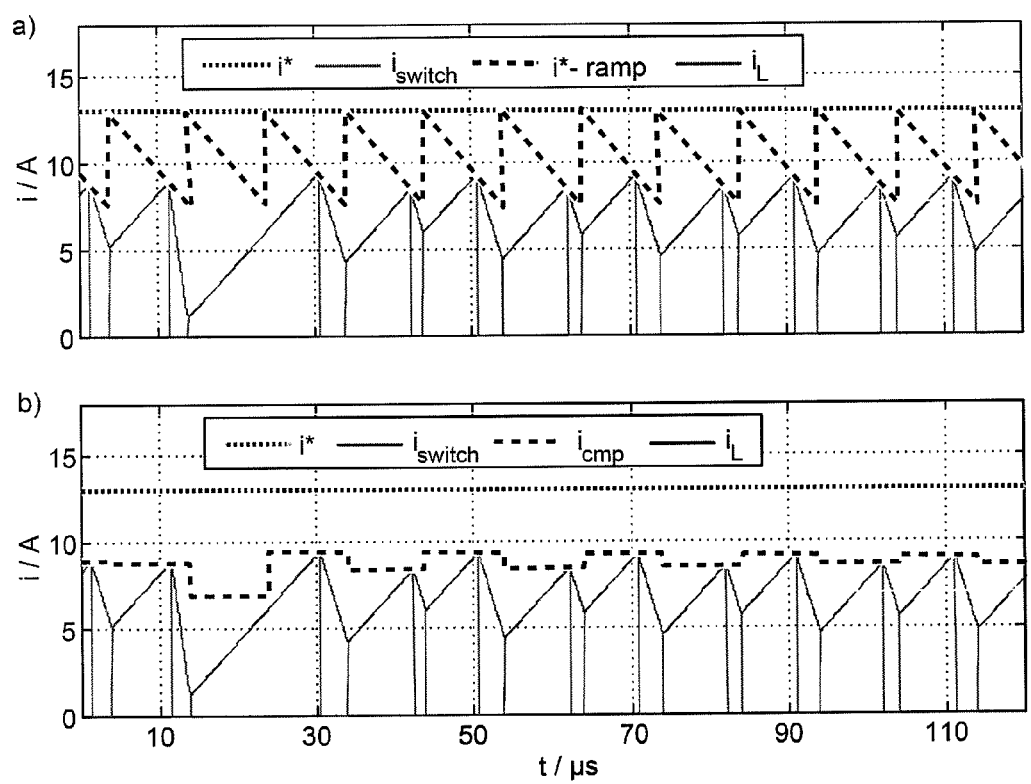
Figure 8:
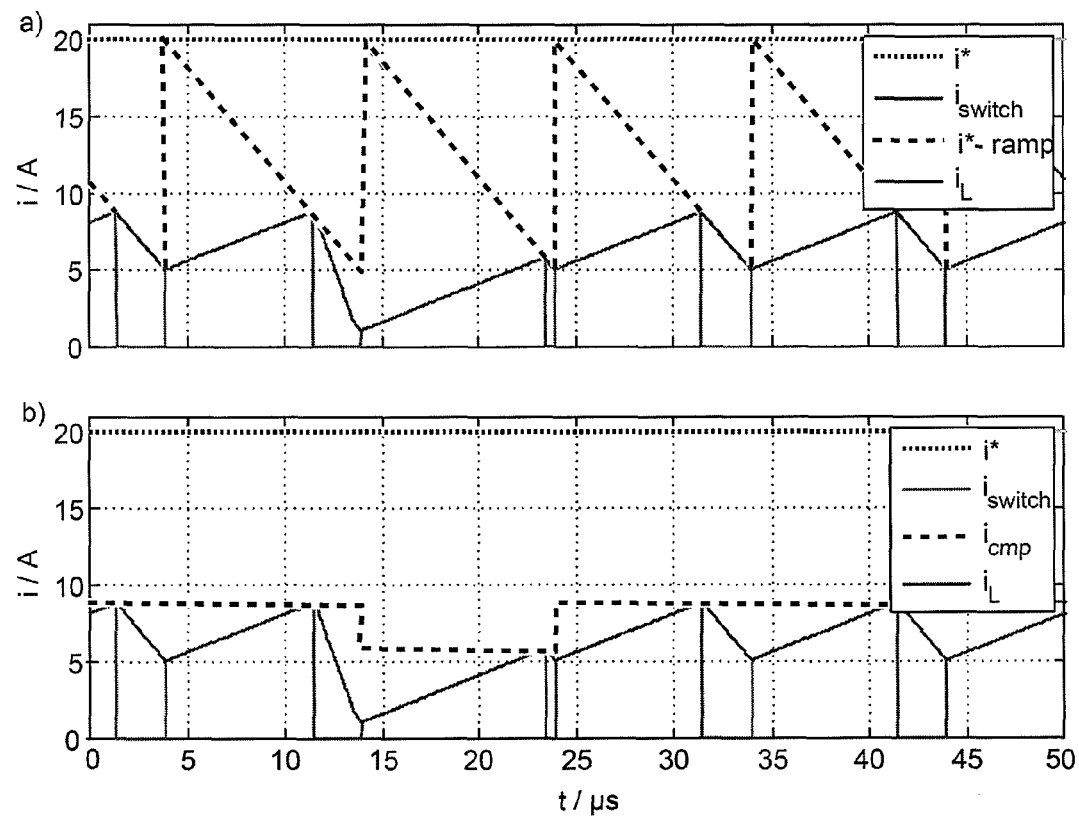

FIG. 7 and FIG. 8 illustrate the response of the peak current control to a simulated perturbation in the inductor current. In FIG. 7 a small compensation factor close to the minimum required compensation was used, so that settling of the inductor current takes several cycles. When applying the optimum slope compensation, the settling of the inductor current occurs within one cycle, as shown FIG. 8. In FIG. 7 simulation results with perturbed inductor current with conventional compensation ramp (a) and with computed current threshold level (b) are shown. In FIG. 8. simulation results with perturbed current and optimum $k_{sc}$ value with conventional compensation ramp (a) and with computed current threshold level (b) are shown.

The control structure depicted in FIG. 5 can be implemented on a 16 bit microcontroller with on-chip comparators (Microchip dsPIC30F2020). This platform can be used to control a simple boost converter forming the PFC rectifier stage of a standard industrial AC-DC converter. In order to run the digital slope compensation concept the power supply can be powered with DC input voltage.

Figure 9:
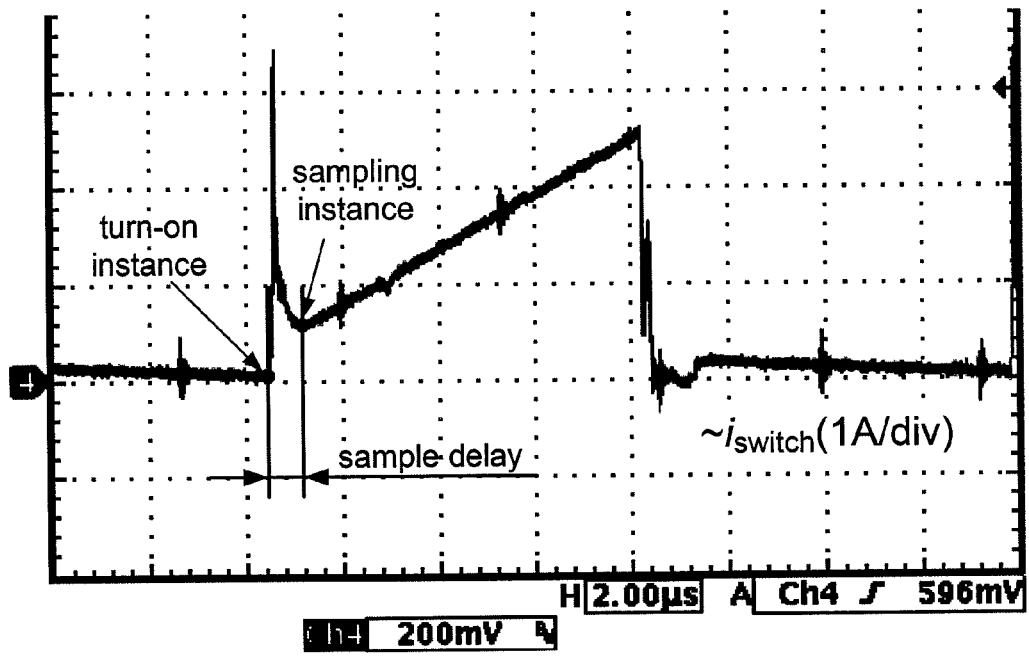
FIGS. 9-15 illustrate results of use of the invention in actual practice
Figure 10:
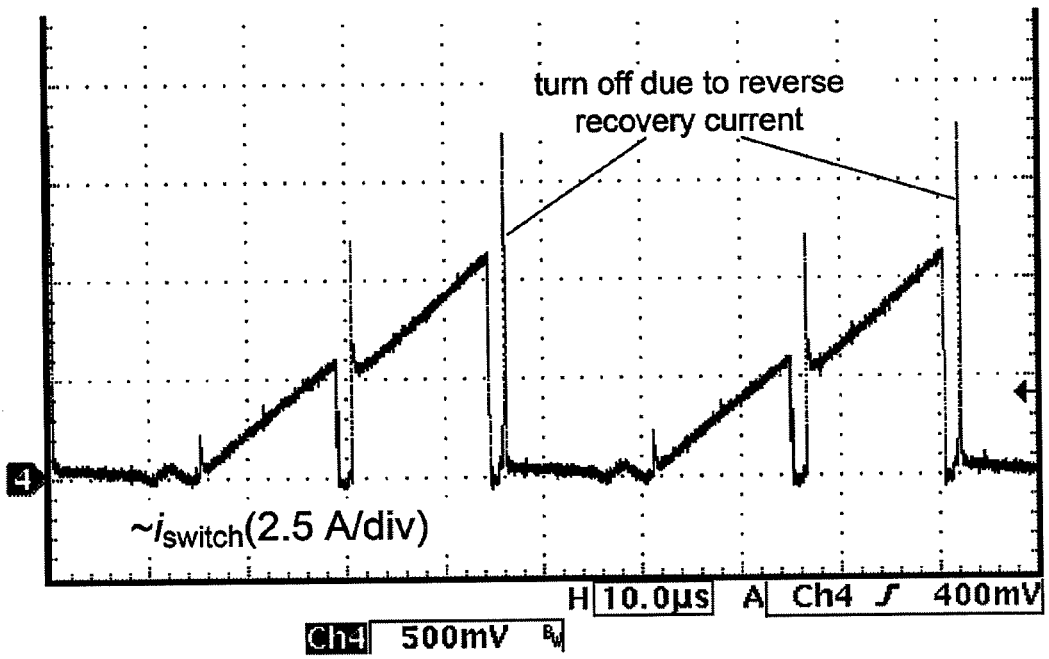

Compared to simulation there are mainly two challenges occurring in practice. The first problem turns up if the current is measured in the MOSFET path 3 as indicated in FIG. 1. This is the case if a simple current transformer is used as sensor. Because of the reverse recovery effect of the boost diode, a current spike appears in the MOSFET path at the beginning of each new cycle (cf. FIG. 9). If current measurement is done in this path, the minimum inductor current cannot be sampled instantaneously at turn-on. However, with a short delay of approximately 600 ns, after the reverse recovery process is completed, the current value can be used. Another problem also caused by the reverse recovery current is that a high current spike can exceed the comparator turn-off threshold and force a faulty trigger of the comparator. This leads to erratic subharmonic oscillations as indicated in FIG. 10. Therefore a leading edge blanking was implemented in software by deactivating the comparator during the reverse recovery process.

Figure 11:
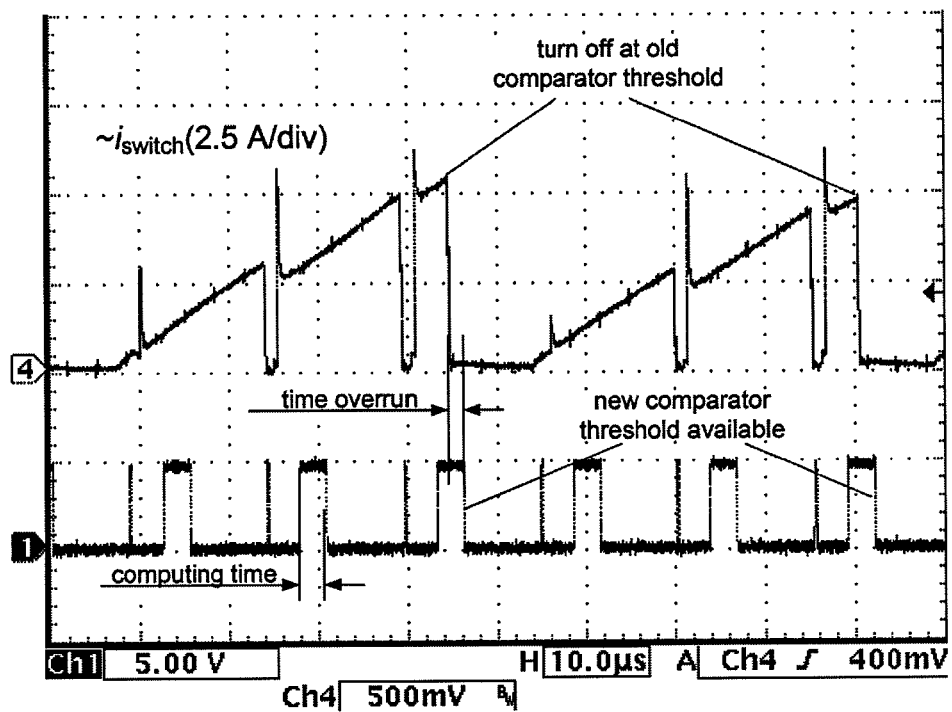

The second difference to simulation is the delay due to the computing time. If the current reaches the old threshold value calculated in the previous cycle before the new threshold value is updated, a premature turn-off occurs. This can also result in undesired subharmonic oscillation (cf. FIG. 11). To avoid such unmeant trigger of the comparator, the threshold value is set to the maximum value before each cycle until the computation of the new threshold value is finished. In order to minimize the resulting dead time, the comparator threshold value is computed firstly in the interrupt routine. Thus, the threshold value is computed with the ksc value of the previous cycle. However, this is not essential as ksc only depends on the relative slowly varying voltage values (cf. Table II).

Figure 12:
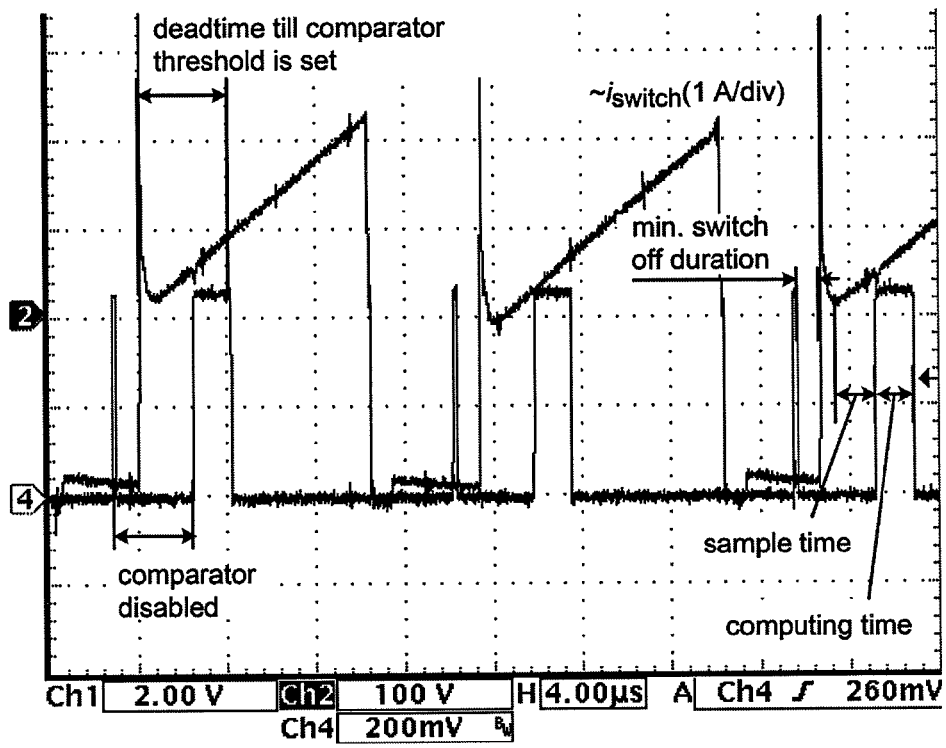
Figure 13:
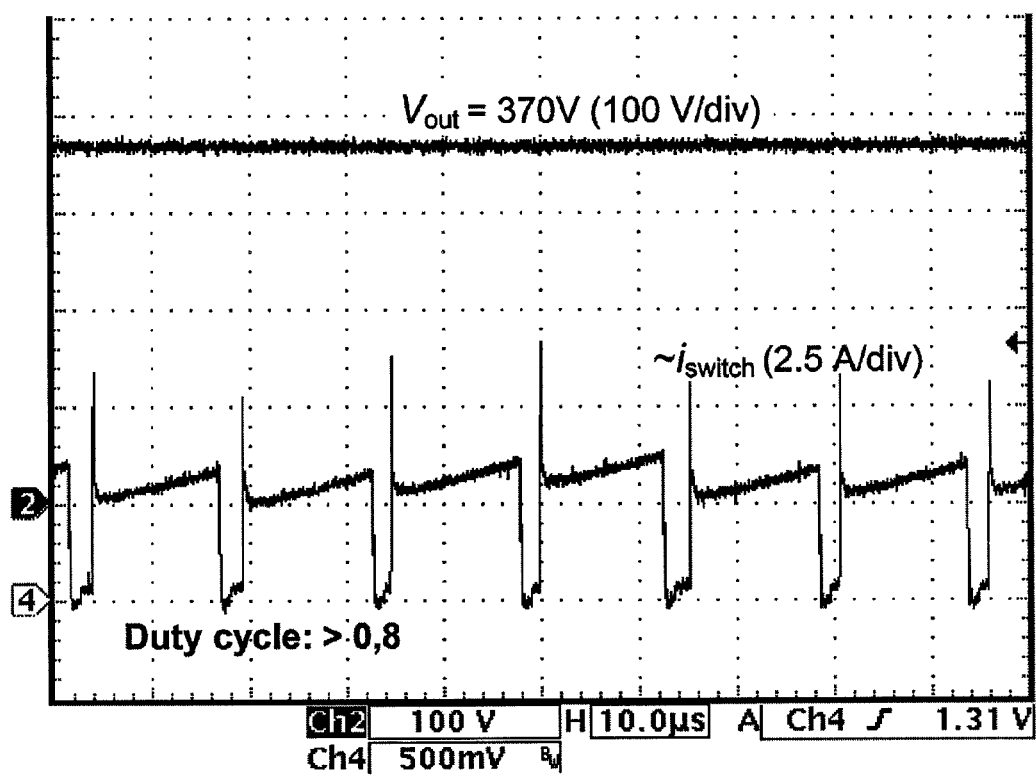

Considering the mentioned practical aspects, the timing shown in FIG. 12 follows. With this implementation, the control loop operates up to high duty cycle values (cf. FIG. 13) without subharmonic oscillation.

Figure 14:
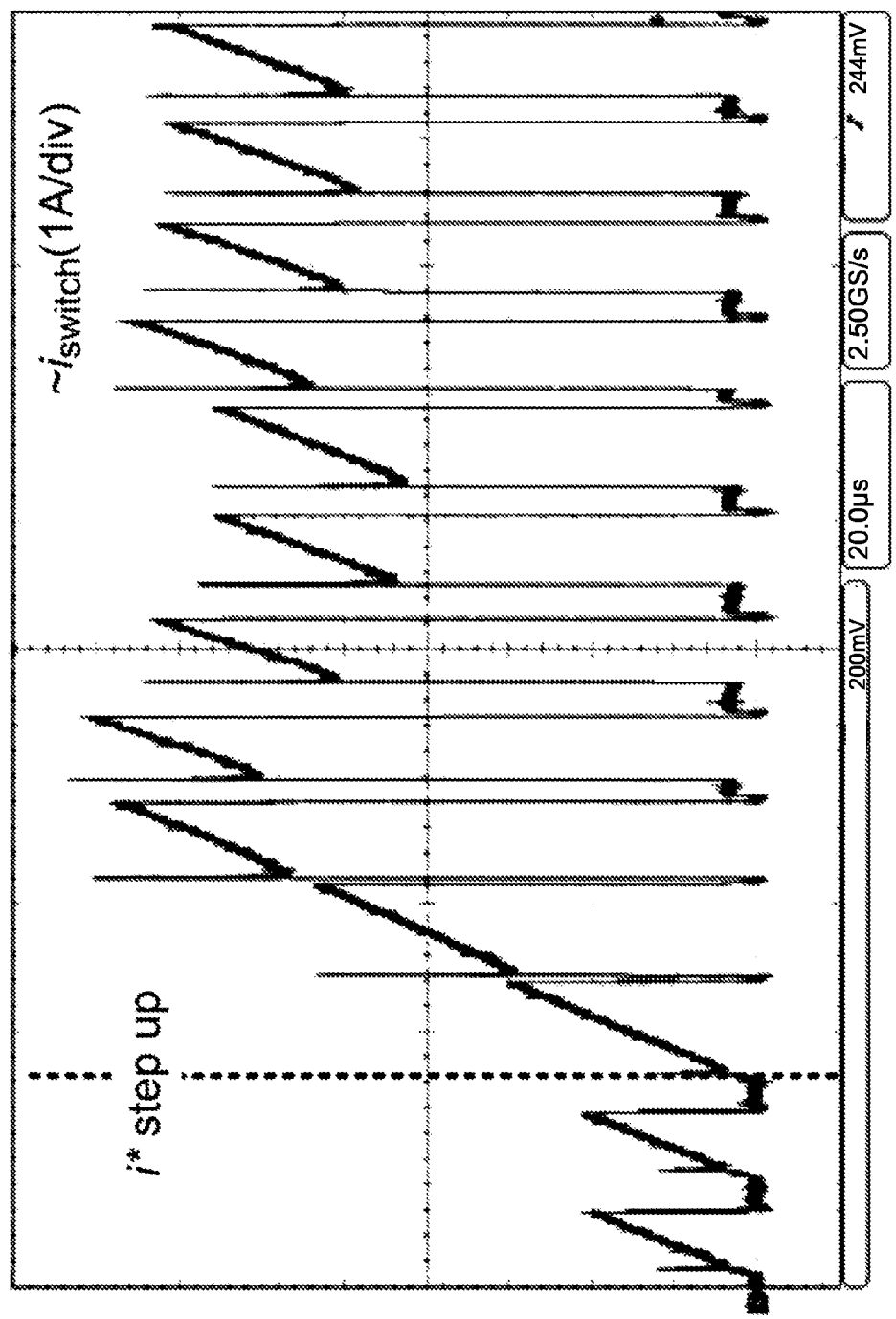
Figure 15:
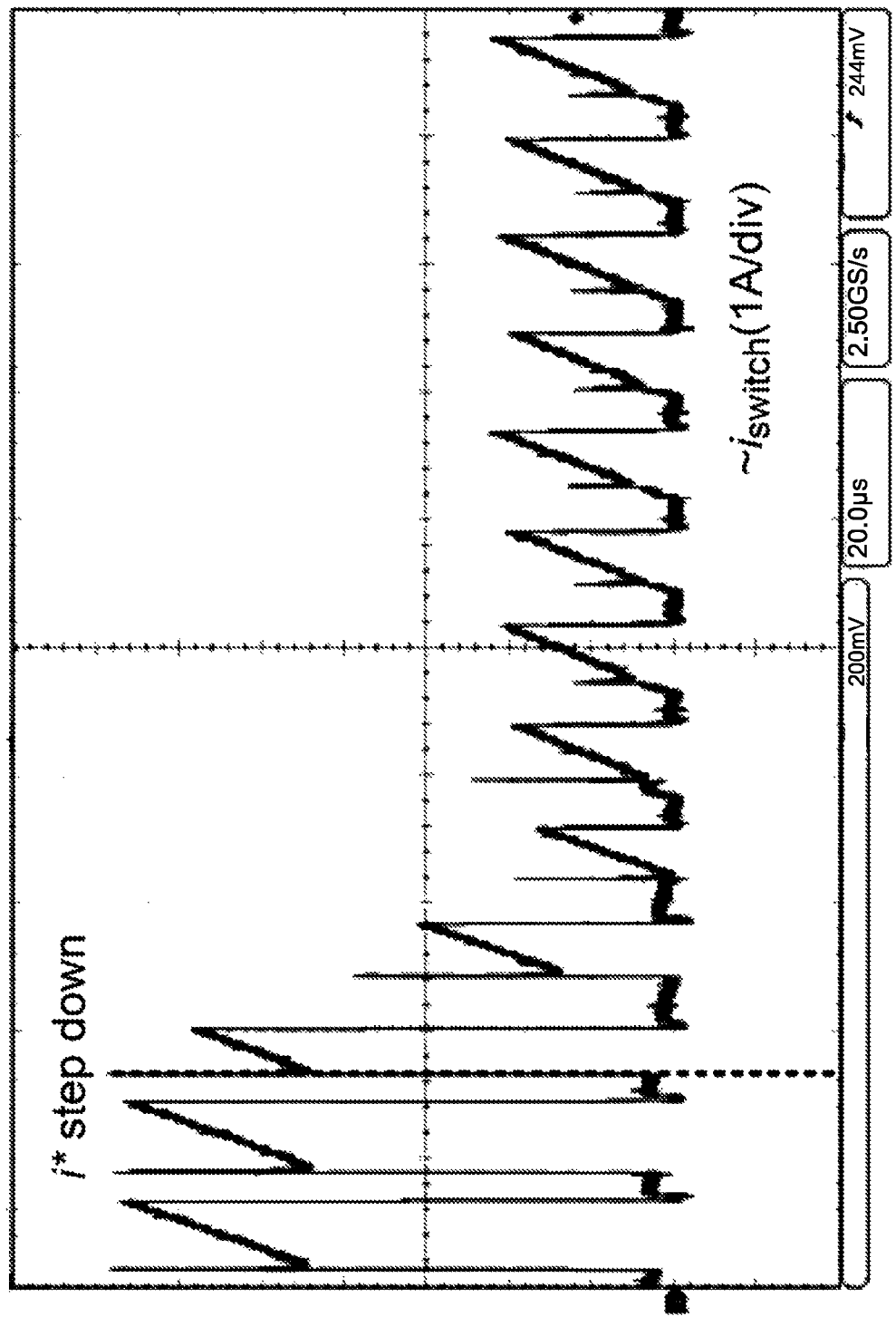

The transient response of a current reference step with an implemented slope factor slightly above the minimum required value is shown in FIG. 14 for a step-up and in FIG. 15 for a step-down. This confirms the high dynamic performance and robustness of the peak current control method with applied digital slope compensation.

Up to now peak current control was predominantly implemented in technique of analog circuitry. However, using available microcontroller with on-chip comparators digital peak current control is feasible with little effort.

The need of slope compensation at duty cycles above 50% to avoid subharmonic oscillation can be solved with simple, but effective digital algorithms. Therefore, it suffices to sample only the valley inductor current. Knowledge of the inductance or any other specific values is superfluous. By directly triggering the PWM unit via on-chip comparator only little computing power is required, whereby the current control can be processed by a simple microcontroller superseding a costly DSP.

Problems occurring in practice due to the reverse recovery current spike and the computing time can be handled with simple measures. So the digital slope compensation turns out as a practical alternative in peak current controlled applications.

Furthermore, a digital implementation offers the potential to apply adaptive slope compensation. Thus, the amount of slope compensation can be adjusted depending on the input and output voltage relation of the converter. This guarantees requested dynamic performance of the current control loop from dead beat up to a desired settling time with or without overshoot.

In FIG. 1, the sensor for sensing an analog inductor current $i_L$ is arranged between the pin for input voltage $V_{in}$ and the inductor L. Alternatively, as indicated in FIG. 2, the sensor for sensing an analog inductor current $i_L$ is arranged as a current transformer 3. Only one of these two alternatives for sensing the analog inductor current $i_L$ is necessary and the described apparatus and method work for both of these sensors. When using a current transformer 3 as a sensor, a more cost effective solution is achieved. Therefore, in most of the cases a current transformer 3 is used for sensing the analog inductor current $i_L$. The current transformer 3 senses the analog inductor current $i_L$ only in the interval $T_1=DT_s$. However, for the described apparatus and method this is sufficient.

In summary, it is to be noted that a digital slope compensation apparatus for a switched-mode power supply is provided with a decreased number of active and passive components as well as improved reliability and extended functionality.

The invention claimed is:

1. A digital slope compensation apparatus for a switched-mode power supply, comprising:
   a sensor for sensing an analog inductor current ($i_L$) of the switched-mode power supply,
   a comparator for generating a trigger signal according to a comparison of an analog current threshold level and the analog inductor current ($i_L$), and
   a pulse width modulator (PWM) for controlling the operation of the switched-mode power supply, wherein the pulse width modulator (PWM) is arranged to be triggered by the trigger signal of the comparator,
   characterised in that
   a first analog to digital converter is arranged for converting an analog output voltage ($V_{out}$) of the switched-mode power supply into a digital output voltage,
   at least one transformation module is arranged for transforming the digital output voltage into a digital current threshold level ($i_{cmp}$),
   a digital to analog converter is arranged for generating the analog current threshold level according to the digital current threshold level ($i_{cmp}$),
   a voltage controller is arranged to receive the digital output voltage and to generate a digital current reference ($i^*$),
   a second analog to digital converter is arranged to convert the analog inductor current ($i_L$) of the switched-mode power supply into a digital inductor current, and
   a digital slope compensation module is arranged to receive the digital current reference ($i^*$), the digital inductor current, and a compensation factor ($k_{sc}$) to generate the digital current threshold level ($i_{cmp}$).

2. Apparatus according to claim 1, characterised in that the compensation factor ($k_{sc}$) is arranged to be a constant value.

3. Apparatus according to claim 1, characterised in that an adaptive slope compensation factor module is arranged to generate the compensation factor ($k_{sc}$).

4. Apparatus according to claim 3, characterised in that:
   a third analog to digital converter is arranged to convert an analog input voltage ($V_{in}$) of the switched-mode power supply into a digital input voltage, and
   the adaptive slope compensation factor module is arranged to receive the digital output voltage and the digital input voltage to generate the compensation factor ($k_{sc}$).

5. Apparatus according to claim 1, characterized in that the apparatus is integrated as a part of a microcontroller.

6. A digital slope compensation method for a switched-mode power supply, wherein:
   an analog inductor current ($i_L$) of the switched-mode power supply is sensed,
   a trigger signal according to a comparison of an analog current threshold level and the analog inductor current ($i_L$) is generated, and
   a pulse width modulated signal is triggered by the trigger signal to control operation of the switched-mode power supply,
   characterised in that
   an analog output voltage of the switched-mode power supply is converted into a digital output voltage,
   the digital output voltage is transformed into a digital current threshold level,
   the analog current threshold level is generated according to the digital current threshold level ($i_{cmp}$),
   the digital current reference ($i^*$) is generated according to the digital output voltage,
   the analog inductor current ($i_L$) of the switched-mode power supply is converted into a digital inductor current, and
   the digital current threshold level ($i_{cmp}$) is generated according to the digital current reference ($i^*$), the digital inductor current, and a compensation factor ($k_{sc}$).

7. Method according to claim 6, characterised in that a compensation factor ($k_{sc}$) with a constant value is used.

8. Method according to claim 6, characterised in that an adaptive slope compensation factor module generates the compensation factor ($k_{sc}$).

9. Method according to claim 8, characterised in that:
an analog input voltage ($V_{in}$) of the switched-mode power supply is converted into a digital input voltage, and
the compensation factor ($k_{sc}$) is generated according to the digital output voltage and the digital input voltage.

10. Method according to claim 6, characterized in that a microcontroller is used to carry out the method.

11. Apparatus according to claim 1, characterised in that the compensation factor ($k_{sc}$) is arranged to be a constant value.

12. Apparatus according to claim 1, characterised in that an adaptive slope compensation factor module is arranged to generate the compensation factor ($k_{sc}$).

13. Apparatus according to claim 1, characterized in that the apparatus is integrated as a part of a microcontroller.

14. Apparatus according to claim 2, characterized in that the apparatus is integrated as a part of a microcontroller.

15. Apparatus according to claim 3, characterized in that the apparatus is integrated as a part of a microcontroller.

16. Apparatus according to claim 4, characterized in that the apparatus is integrated as a part of a microcontroller.

17. Method according to claim 6, characterised in that a compensation factor ($k_{sc}$) with a constant value is used.

18. Method according to claim 6, characterised in that an adaptive slope compensation factor module generates the compensation factor ($k_{sc}$).

* * * * *